(12) United States Patent
Von Kahle

(10) Patent No.: US 8,256,031 B2
(45) Date of Patent: Sep. 4, 2012

(54) GRIPPING DEVICE FOR A VEHICLE RIDER

(76) Inventor: Jon B. Von Kahle, Fair Oaks, CA (US)

( * ) Notice: Subject to any disclaimer, the term of this patent is extended or adjusted under 35 U.S.C. 154(b) by 209 days.

(21) Appl. No.: 12/801,589

(22) Filed: Jun. 16, 2010

(65) Prior Publication Data

US 2010/0320724 A1 Dec. 23, 2010

Related U.S. Application Data

(60) Provisional application No. 61/268,888, filed on Jun. 17, 2009, provisional application No. 61/280,823, filed on Nov. 9, 2009.

(51) Int. Cl.
*A41F 9/00* (2006.01)
*B62J 9/00* (2006.01)
(52) U.S. Cl. .......................... 2/311; 280/288.4
(58) Field of Classification Search .............. 2/309, 311, 2/338; D29/100, 101.5; 280/288.4; 482/140, 482/142, 110, 92
See application file for complete search history.

(56) References Cited

U.S. PATENT DOCUMENTS

| | | | |
|---|---|---|---|
| 3,533,107 A * | 10/1970 | Garbarino et al. ............... 2/93 |
| 3,533,197 A | 10/1970 | Raneri et al. |
| 3,562,812 A | 2/1971 | Greggains |
| 3,840,902 A * | 10/1974 | McNeill ............................ 2/311 |
| 3,896,499 A | 7/1975 | Kelly |
| 4,028,742 A | 6/1977 | Marquis |
| 4,324,205 A * | 4/1982 | Goldmacher ..................... 2/300 |
| 4,396,013 A * | 8/1983 | Hasslinger ..................... 128/845 |
| 4,411,222 A | 10/1983 | Wolfson |
| 4,441,707 A * | 4/1984 | Bosch ........................... 482/131 |
| 4,625,334 A | 12/1986 | Proffer |
| 4,714,246 A * | 12/1987 | Parisien ........................ 482/110 |
| 5,074,795 A * | 12/1991 | Clark ............................ 434/253 |
| 5,081,719 A | 1/1992 | Donnelly |
| 5,152,013 A | 10/1992 | Johnson |
| 5,369,804 A * | 12/1994 | Metcalf ............................. 2/69 |
| 5,692,996 A * | 12/1997 | Widerman ...................... 482/93 |
| 5,709,634 A * | 1/1998 | Pointer ......................... 482/105 |
| D394,481 S * | 5/1998 | DeLisse ....................... D21/694 |
| 6,142,843 A * | 11/2000 | Haase ........................... 441/129 |
| 6,216,636 B1 * | 4/2001 | Butchko ....................... 119/497 |
| 6,450,512 B1 * | 9/2002 | Carr ........................... 280/14.27 |
| 7,097,602 B1 * | 8/2006 | Kim ............................. 482/140 |
| 7,137,640 B1 | 11/2006 | Rice et al. |
| 2003/0207736 A1 * | 11/2003 | Munguia, Jr. ................... 482/69 |
| 2008/0007020 A1 * | 1/2008 | Holman ................... 280/87.051 |

FOREIGN PATENT DOCUMENTS

CA 2228498 A1 * 8/1999

* cited by examiner

*Primary Examiner* — Ruth Ilan
*Assistant Examiner* — Daniel Yeagley
(74) *Attorney, Agent, or Firm* — Donald Grant Kelly

(57) ABSTRACT

A safety gripping device for use by a passenger riding a vehicle in tandem behind a vehicle operator. The device is in the form of a discrete article with ergonomically inclined handles at either end to be manually positioned by the passenger generally in front of the vehicle operator's torso. Rather than depending on straps or belts worn by the operator or handles directly affixed to the vehicle, the gripping device affords a convenient, comfortable and natural way of gripping, generally avoiding a personal hugging engagement with, or distracting pressure upon, the vehicle operator. This facilitates longer journeys with prolonged enjoyment on a shared vehicle. This portable safety device helps the passenger to better and more safely balance and steady him/herself with respect to the vehicle and its operator. The device may be fabricated or molded from a flexible material, and conveniently include an integral storage container with removable cap.

4 Claims, 6 Drawing Sheets

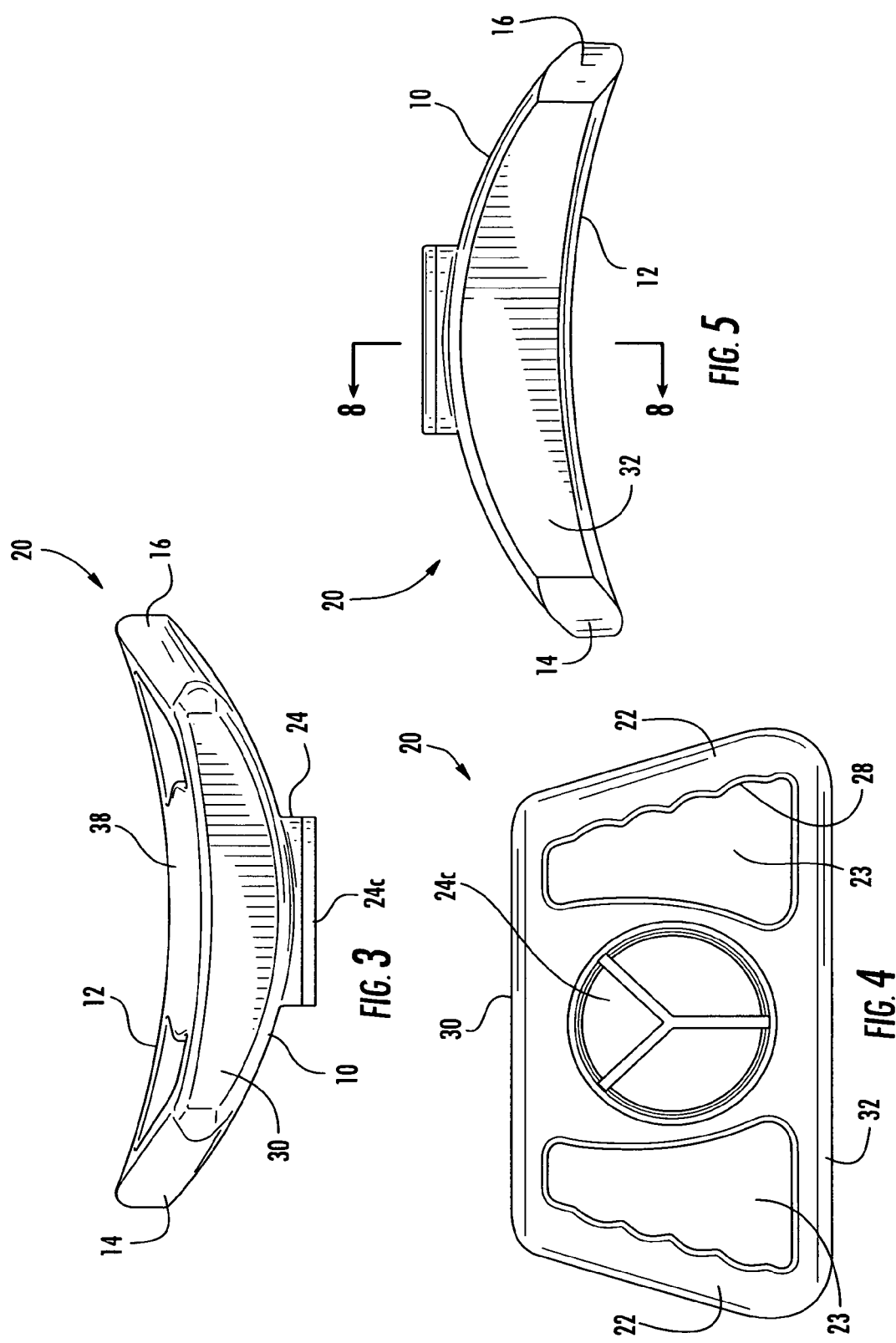

GRIPPING DEVICE FOR A VEHICLE RIDER

CROSS REFERENCE TO RELATED APPLICATION

All priority benefits under 35 USC 119(e) of Provisional Patent Application Ser. No. 61/268,888 filed Jun. 17, 2009 and Provisional Patent Application Ser. No. 61/280,823 filed Nov. 9, 2009 are hereby claimed under 35 USC 119(e) and the contents thereof in their entirety incorporated herein by reference for all purposes.

FEDERALLY SPONSORED RESEARCH

Not Applicable

SEQUENCE LISTING OR PROGRAM

Not Applicable

BACKGROUND OF THE INVENTION

1. Field of the Invention

The present invention relates generally to vehicles and other forms of transportation which may carry two or more riders in driver/passenger tandem relationship. More particularly, the present invention relates to devices, apparatus and/or methods to maximize passenger balance, stability and safety during a ride marked by bumps, jolts, swerves, unexpected acceleration or even accidental spills.

While not intended as limited to such field of use or application, the present invention is described herein in the context of motorcycles which frequently are ridden by more than one person in tandem operator/passenger mode. The reader will appreciate that the present invention enjoys broader application ranging from personal water craft (PWC, e.g., JET SKI®) to snowmobiles, all terrain vehicles, motorbikes, scooters and even horseback.

2. Background of the Invention

Without doubt, motorcycle riding (and similar vehicle excursions such as PWC, snowmobile and all terrain vehicle) can be both economic and exhilarating. However, based on US Government studies, these experiences are not without serious risk of injury or worse. The Federal Highway Administration (via the Agency's website address fhwa.dot.gov/motorcycles/, updated Nov. 10, 2009) reports a dramatically increasing rate of motorcyclist deaths on U.S. roadways. Statistics on reported incidents show motorcycle rider fatalities (including operator and passenger) rose 115 percent between 1997 and 2005.

A research report* from the National Highway Traffic and Safety Administration, shows U.S. crash incidents resulting in motorcyclist injuries rose from 49,000 in 1998 to 103,000 in 2007—a 110% increase. Throughout that 10-year span, there were 703,000 reported motorcyclist injuries with 125,000 of those being passengers. Amazingly, 50% of these injuries occurred in accidents which did not involve other vehicles. (*NHTSA's National Center for Statistics and Analysis, *Traffic Safety Facts, Research Note* DDT HS 811149; July 2009, available via Internet web address: -nrd-.nhtsa.dot.gov/Pubs/811149.pdf)

When two people ride in tandem relationship on vehicles of the type mentioned hereabove, the rear rider (typically referred to as the passenger) seeks stabilization and safety from falling by holding onto a vehicle part such as a seat frame or other trim. However, unless such frame and trim are a specially designed safety features, they typically offer insufficient gripping areas. Alternatively, passengers may cling to the operator indirectly via the operator's belt, clothing or harness, or most often embracing about the operator's midsection. While such precautions help steady the passenger and may prevent the passenger's fall from the vehicle during sudden acceleration or other unexpected maneuvering, this practice can be troublesome or undependable for a variety of reasons. The passenger's hands and arms may become tired over an extended period of time.

If the passenger happens to be relatively small (e.g., a child), or the operator relatively large, reaching about the operators midsection may pose considerable challenge. Moreover, vehicle operators may be distracted and passengers may grow weary from the constant embrace. Another common issue is that the passenger may have an aversion to close physical contact and purposely avoid or minimize the physical embrace with adverse consequences. Unfortunate passenger tumbles undoubtedly occur far more than reported.

Adding an extra rider to a motorcycle or similar conveyance considerably changes the vehicle's operational dynamic, particular where the operator must lean into a roadway curve, or negotiate an unexpected turn, braking action or acceleration. For example, in two-up mode (biker jargon for tandem riders), the added passenger weight and consequent shift in collective mass and center of gravity can challenge even the most experienced operator. Often advance adjustment is necessary when taking on a passenger. For example, the operator often may find it necessary to adjust the vehicle suspension and/or modify the tire pressure to accommodate the marked change. Too often this precaution is not taken, resulting in added instability.

The situation is further complicated when motorcycle passengers are found to be woefully inexperienced with respect to motorcycle dynamics, and clueless as to their own important collaborative role in vehicle control. From the passenger's viewpoint, the singular objective throughout the ride is hanging on. Succeeding in that objective without distracting or otherwise encumbering the vehicle operator is no small feat. For a variety of reasons and almost routinely, statistics clearly show that passengers continue tumbling from the rear of moving motorcycles.

This problem is widely recognized and often pursued by inventors, but obviously inadequately resolved. Proposed, and even patented, technical solutions have ranged from affixing dedicated passenger hand-grips to cycle frames, seats and gas tanks, to a myriad of operator-worn harnesses, belts or jackets incorporating specialty loops or handles to be grasped from behind. The following are documented examples of approaches taken.

U.S. Pat. No. 7,137,640 granted to inventors Rice et al. proposes a device that essentially affords a motorcycle passenger's direct interconnection to a portion of the vehicle body so as to maintain passenger's balance during transit. Rice et al. introduced a main strap loop configured to gird a forward portion of the operator's seat. Attached to lateral sides of a main strap loop are additional strap loops for grasping by each hand of the passenger. By use of this device, the passenger avoids engaging or directly holding onto the operator. The passenger may elect to hold onto the straps, as needed or desired. The positive aspect of this design, of course, is that the passenger can secure her/himself directly to the cycle and without interfering with (or binding engagement to the driver.

Unfortunately, however a passenger's tendency with such a device as taught by Rice et al. (during a maneuver-demanding crisis and more particularly during an impending spill) is that the typically inexperienced passenger will desperately cling to the strap loops, keeping both the driver and passenger entangled with the foundering vehicle. Seasoned riders know the operator (and passenger) should disengage from a cycle if it goes into a side-down slide. Protected by adequately robust garments, boots and headgear, the tumbling cyclists are best left to slide or roll independently as their ride goes down.

Specialized belt gear has been the topic of many cycle safety device patents. For example, Wolfson's U.S. Pat. No. 4,411,222 includes a pair of grip devices adapted to be attached to a belt or the like worn by the vehicle operator. Each grip device includes a handle adapted to be gripped by the passenger to maintain balance even when the vehicle negotiates a sharp turn. Donnelly's U.S. Pat. No. 5,081,719 shows another version of the driver belt configured for passenger grasping. In fact, the Donnelly device envisions a plurality of securement handles slidably mounted about the belt and locked into position for grasping by the passenger. Kelly (U.S. Pat. No. 3,896,499) and Johnson (U.S. Pat. No. 5,152,013) show still other designs where a driver's belt is modified to enable gripping by the passenger.

While belt-type devices such those discussed hereabove (by Wolfson, Donnelly, Kelly and Johnson) clearly eliminate the necessity of the passenger to retain balance by holding the operator about his/her waist or by attempting to grip an edge of the driver's seat, they still impose distracting passenger-on-operator contact. More seriously, in a vehicle emergency situation, the passenger's anxious grasp of the driver's belt handles, for example, will serve to place the interlocked riders in grave jeopardy if the bike were suddenly to go down.

In U.S. Pat. No. 4,028,742 Marquis proposes similar paraphernalia including both belt and shoulder straps worn by the cycle operator. These include spaced apart handles mounted such that they can be resiliently extended for grasping as needed, then return to an original position when not in use. Here, too, directly associating the safety device with the body of the operator places both riders at risk in an accident.

Patentee Greggains' operator jacket described in U.S. Pat. No. 3,562,812 is equipped with loops or handgrip elements. Similarly, an operator's safety garment with side slits enables insertion of a passenger's hands for grasping to an internal belt/handle arrangement is set forth by Raneri et al. in U.S. Pat. No. 3,533,107. These are further refined embodiments of the common theme—handy for passenger gripping yet decidedly unsafe, since both promote physical interconnection of the passenger to the cycle operator.

This assessment similarly applies to patentee Proffer's safety harness depicted in U.S. Pat. No. 4,625,334. The latter safety harness is constructed of webbing presenting alternately spaced handholds specially designed to be worn by the vehicle operator.

Existing technologies to protect and/or stabilize passengers are seen to involve (1) a physical interconnection to, or constant engagement with, the vehicle operator, or (2) a passenger interconnection or constant gripping engagement with the vehicle itself. As explained, this is not a good thing. Sorely needed in this field is a solution delivering tandem passenger security and balance as necessary, but a solution which does not involve direct attachment to the vehicle or its operator. Such an inventive solution is described in detail herebelow.

BRIEF SUMMARY OF THE INVENTION

The present invention is directed to a safety gripping device configured for use by a passenger on any vehicle where the passenger is positioned in tandem relationship behind the vehicle operator. Such a vehicle may include but are not limited to a motorcycle, a personal water craft, a snowmobile, and the like. The novel passenger gripping device is a discrete article configured to be manually positioned by the passenger generally in front of the vehicle operator's torso midsection. In this context, the positional terms "front" and "frontal" relate to a forward direction of vehicle movement, where "rear" and "rearward" refer to a backward direction of vehicle movement generally opposite front or frontal. The term "discrete," in the present context, means unconnected and individually distinct. "Article," in the present context, refers to a separate item or thing of a certain kind. A discrete article may of course include a number of integral or interconnected subparts or sections.

The safety gripping device serves the principal role of interconnecting the passenger's hands and arms in a position that will make the passenger feel securely balanced, safely positioned, and prepared for the unexpected dynamics of a moving motorcycle. Comfortable, naturally formed gripping handles provided at or near each terminal end of the gripping device facilitate prolonged gripping by the passenger. At the discretion of passenger or operator, or when force of momentum dictates, the gripping device may engage the operator's frontal torso but may also, to the extent possible, be somewhat spaced from the operator's body. The gripping device is configured as a free-standing element to be grasped and manipulated only by the passenger's (user's) hands.

Compared to prior art examples discussed hereabove, the gripping device affords a much more comfortable and natural way of gripping, generally avoiding a personal, hugging engagement with, or distracting pressure upon, the vehicle operator. This facilitates longer journeys with prolonged enjoyment on a shared vehicle. To that end, the present invention helps the passenger to better and more safely balance and steady him/herself with respect to the vehicle and its operator.

With the safety gripping device in place, the passenger will be attuned and synchronized to the operator's changes of physical attitude. For example, the passenger can sense the operator's leaning posture maneuvering or banking the vehicle into a turn, yet the device need not necessarily have continuous or pressuring contact with the operator's torso. The gripping device may of course engage the operator's torso, but this can be generally brief; and not a distracting physical engagement as discussed above.

In the event the vehicle lurches forward, as with sudden acceleration, or suddenly engages in lateral or zigzag motion, the passenger may rely upon a two-handed grip on the novel safety device to maintain position on the vehicle. In other words, by retaining a firm grasp only on the discrete safety gripping device, the passenger cannot fall except in extraordinary circumstances. In case of total balance and traction loss, the operator and passenger are immediately free to slide independently of a dangerously pummeling vehicle.

The unique construction, angular hand-slot orientation and pliable nature of the safety device afford an easy yet firm grip with enhanced control and confidence. A pliable grasping feature avoids, or at least minimizes, hand fatigue which otherwise could result in the passenger falling off the back of the vehicle. Instead of the stressful interlocking the fingers or wrist, as routinely done by thousands of passengers, the present solution allows the passenger to comfortably hold the gripping device with both hands in a natural, comfortable, and safe position.

The gripping device of the present invention is compact, simple, lightweight and easy to use. It is universal and provides safety and comfort for anyone wishing to ride as a passenger on the back of a motorcycle or similar vehicle. Importantly, the safety gripping device of the present invention is a separate and independent unit which is neither part of, nor attached to, the vehicle or the clothing of either rider.

As such, the safety gripping device does not require modifications to the vehicle or the operators clothing, nor does it require the operator wear uncomfortable, distracting belts and harnesses. Besides that, the gripping device is in no way a permanent fixture demanding modification of the vehicle frame or other parts. When not in use, the gripping device can easily be stowed away in a bin or saddlebag. Alternatively, it can be conveniently carried by its user (for example, when dismounted), thus taking advantage of its storage feature (to be discussed below). The device can be manufactured, fabricated or molded from readily available materials so as to be durable and weather-resistant, and fully capable of being personalized or otherwise customized.

Other aspects of the present invention will be apparent from the following detailed description, taken in conjunction with the accompanying drawings, which illustrate, by way of example, the principles of the invention.

BRIEF SUMMARY OF THE SEVERAL VIEWS OF THE DRAWINGS

FIG. 3 is a top plan view of the safety gripping device;

FIG. 4 is a front elevation view of the safety gripping device;

FIG. 5 is a bottom plan view of the safety gripping device;

DETAILED DESCRIPTION OF THE INVENTION

Figure 1:
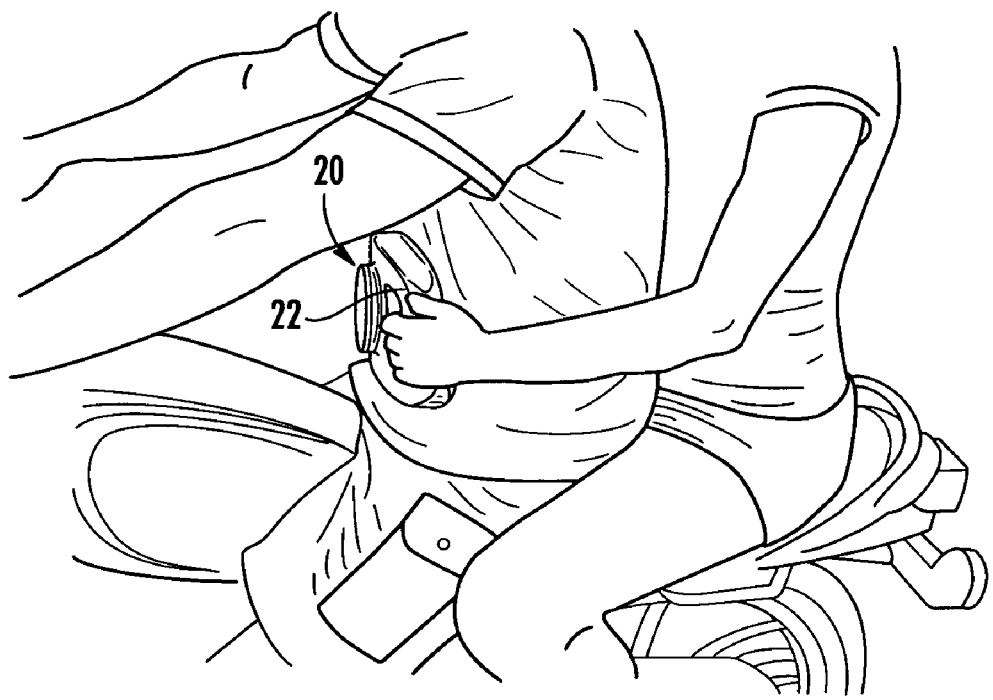
FIG. 1 is a side perspective of the safety gripping device for a vehicle rider, showing an operator and passenger in tandem relationship on a vehicle with the passenger using the novel safety gripping device for stabilization with respect to the vehicle and its operator.
Figure 2:
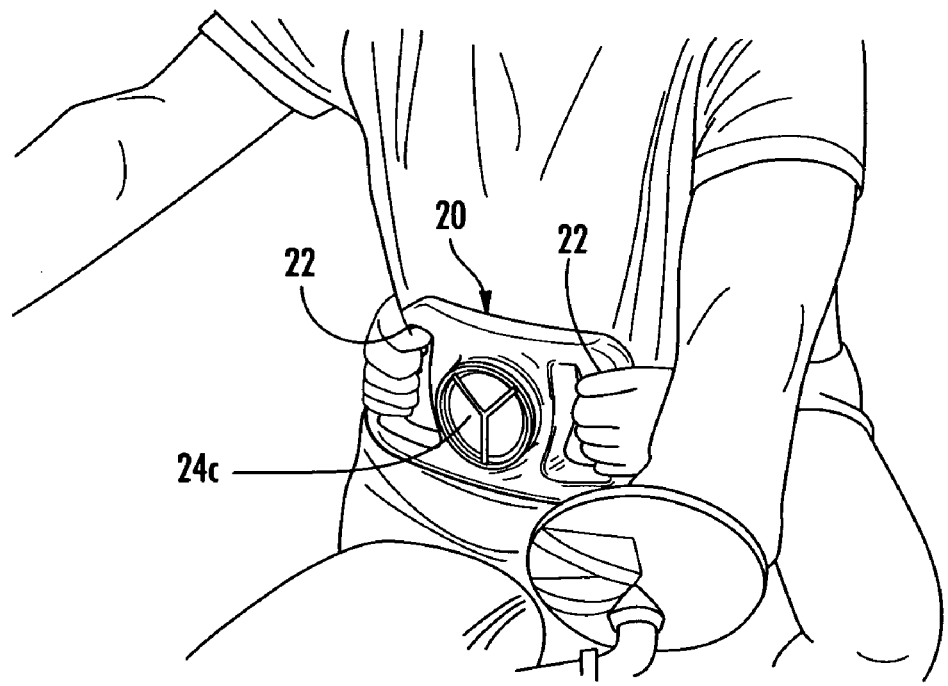
FIG. 2 is a front perspective of a vehicle and operator showing the safety gripping device in use by a passenger.
Figure 6:
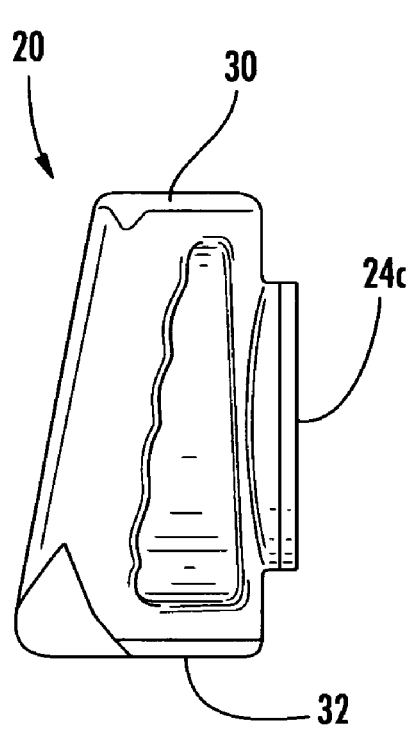
FIG. 6 is a first end elevation view of the safety gripping device.
Figure 7:
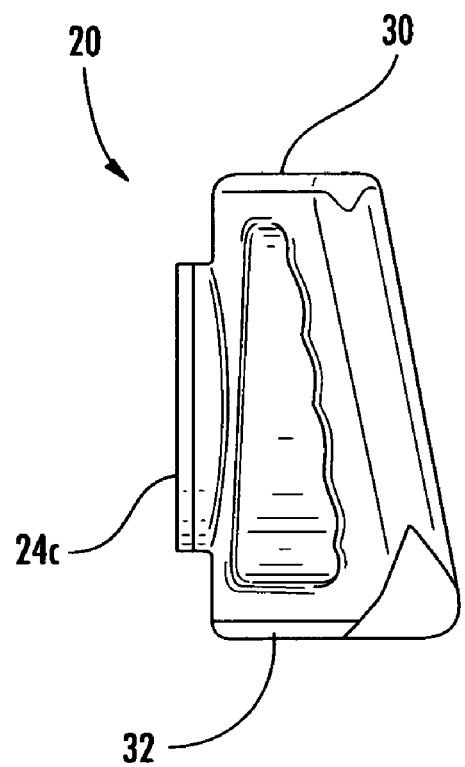
FIG. 7 is a second end elevation view of the safety gripping device.
Figure 8:
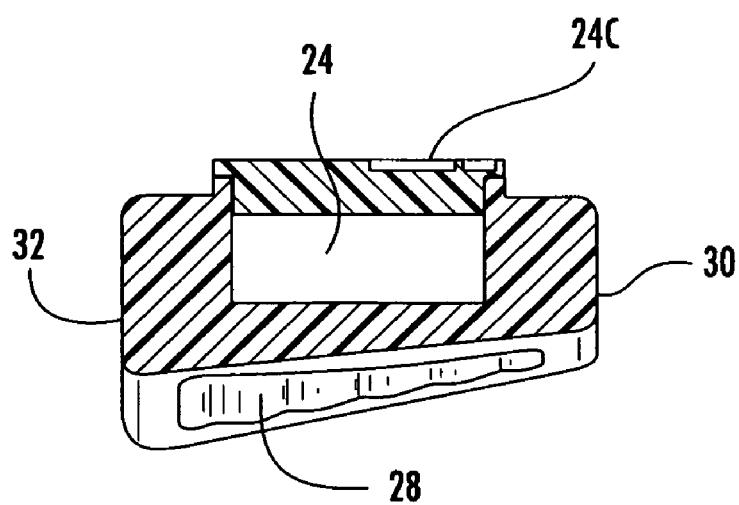
FIG. 8 is a cross-sectional view of the safety gripping device taken along line 8-8 of FIG. 5.

Referring initially to FIGS. 1-2, there are illustrated side and front perspective views respectively of a gripping device 20 in use by a vehicle rider. More particularly, these images depict a rear, tandem rider (passenger) using the safety gripping device 20 of the present invention in order to retain balance and safe position. While the subject vehicle is illustrated as a motorcycle, this specific vehicle type should not be considered as limiting the invention scope. The safety gripping device 20 comprises a discrete article configured as a body with relatively coextensive front and rear faces 10, 12. Each of two extreme ends of the front and rear face respectively form end faces 14, 16 generally defining a thickness of the gripping device. Actual thickness, of course, is dependent upon tensile strength requirements and durability of materials employed in the structural makeup of the gripping device 20.

Each of the two ends 14, 16, is configured to define an opening or slot 23 forming a handle 22. Handles 22 are characterized by open slot 23 throughout (or at least partially through) the device thickness and may be configured with grooves of number and shape generally comporting to hands and fingers of a typical passenger. The passenger sits behind, and in tandem relation with, the vehicle operator. The passenger manually places gripping device 20 in front of a midsection of the operator, then holds onto the spaced-apart handles 22 with both hands.

Handles 22 provide a convenient and structurally effective place for the hands of the rear rider to hold onto while riding on the vehicle. Handles 22 are configured to be conveniently angled to provide a natural positioning of the hands for ergonomic correctness as the passenger generally horizontally extends her/his arms about the operator's midsection, reaching around an adequate extent to grasp the device 20 handles 22.

The passenger's arms extend generally horizontally, partially about the midsection of the operator with the passenger's palms facing inwardly and slightly backwards toward the passenger's seated position. The passenger's fingers lock about handles 22 giving the passenger stabilization control while holding on comfortably and as tightly as deemed necessary or desired. To assume the riding position, the passenger initially grasps safety gripping device 20 in one hand, positions gripping device 20 adjacent to the midsection of the operator, and follows up by grasping device 20 with the other hand.

Figure 9:
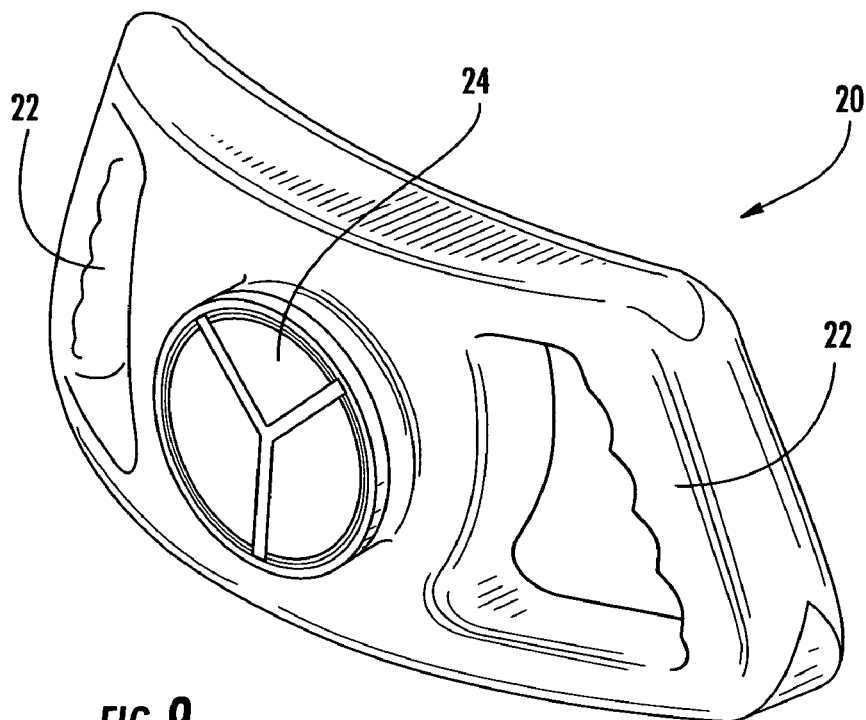
FIG. 9 is a front perspective view of the safety gripping device.

Referring now to FIGS. 3-9 with detailed images of the safety gripping device 20, there are illustrated: a top plan view (FIG. 3) of the device 20 showing its slightly curved contour 38; front elevation of the device 20 (FIG. 4); bottom plan view (FIG. 5), end elevation (FIG. 6), opposite end elevation (FIG. 7), cross sectional view (FIG. 8) of the device taken at reference section line 8-8 (FIG. 5); a detailed front perspective of an isolated, discrete, free-standing safety gripping device 20 (FIG. 9), and a second, less-detailed front elevation of the device 20 (FIG. 10), similar to FIGS. 4 and 9, illustrating handle 22 angle.

FIGS. 11-14 are similar in substance and content to FIGS. 4, 3, 8 and 6, but are intended to illustrate a more stylized embodiment of the present invention. Clearly, other stylized versions can be undertaken without departing from the intended scope of the invention herein claimed.

Gripping device 20 may be manufactured or fabricated from a great variety of materials or material stock. For example, fabricating the device 20 as a semi-rigid polymer body overlaid at least in part with a polymeric foam material has a number of advantages, including lightness in weight, simplicity and ease of fabrication, as well as ensuring a sure-grip surface and comfortable fit to the passenger's hand. The foam material covering enhances friction between gripping device 20 and the passenger's hands thereby lessening the chance of slippage whereby the passenger's grip or the device itself could be lost in transit.

Handles 22 are formed by structurally defined voids 23 adjacent gripping device 20 ends 14, 16. Alternatively, though not illustrated, such handles could be formed (by molding or machining) as slots which do not pass entirely through the gripping device. In other words, the voids 23 may be in the form of grooves adequate for facilitating gripping by the passenger. In any case, these handles 22 may be formed as a result of a molding process or may be machined in a post-molding or other fabrication stage. Again, as illustrated in FIGS. 2, 4, 9-14, handles 22 are conveniently located at either end 14, 16 of the body of safety gripping device 20, and serve to indirectly interconnect the passenger's hands.

Merely as an example of the proportions and size that could be appropriate but in no way limiting claim scope, the safety gripping device 20 could measure approximately: 6.50 inches across the face (from top to bottom edge thereof 30, 32); 12.50 inches laterally across (end-to-end, 14, 16); and 2.50 inches thick (between front and rear face) at a thickest point or portion thereof. That said, it is important to add that any of a range of measurements can provide an adequately serviceable gripping device. Essentially, in terms of the weight, size and handle-shape of the gripping device, the passenger must be able to: 1) manage proper positioning of the device; 2) hold the device in its operative position for extended time periods; 3) support the device by extended hands with limited contact or interference with the vehicle operator; 4) conveniently carry and/or store the device when not used in transit as a safety device.

Safety gripping device 20 may be internally or externally reinforced by a steel cable, plate or rod (not shown) as an embedded or attached element for added strength and durability. Central storage unit 24 is illustrated as generally circular but could be any convenient shape such as square or rectangular (not shown). A suggested material for storage unit 24 fabrications would be recycled aluminum, plastic, tin or any equivalent material. The circular or round storage compartment 24 version illustrated can be provided with a weatherproof screw-on cap 24C of suitable breadth and depth.

Central storage compartment 24 accommodates storage of travel items such as keys, money, personal identification, credit cards, cell phone, and the like. Central storage unit 24 may be air-tight and resistant to water seepage, enabling the device to float and to maintain the riders' possessions dry when gripping device 20 is used in a wet environment. Referring to FIGS. 3 and 5, it is noted that gripping device 20 is slightly contoured 38 at surface 12 so as to conform comfortably with the operator's body shape if and when mutually engaged. Referring to FIG. 4 it is noted that handles 22 of safety gripping device 20 may include contoured indentations dimensioned to comfortably accommodate the passenger's fingers.

Figure 10:
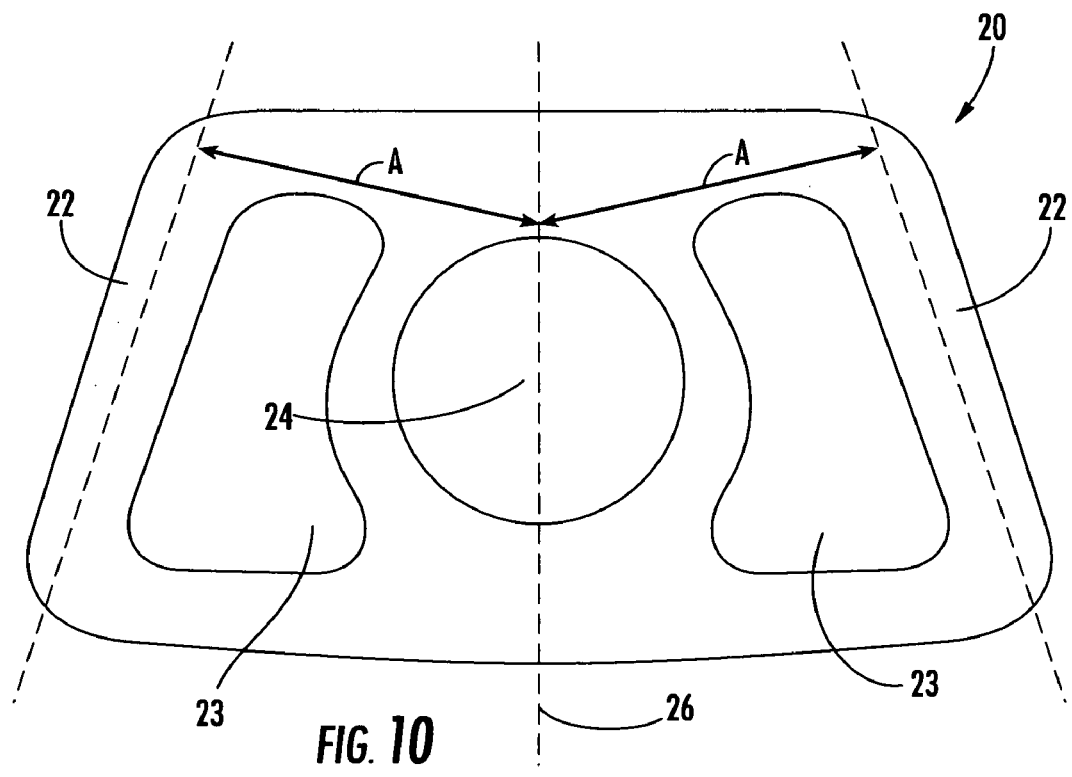
FIG. 10 is a simplified front elevation schematic of the safety gripping device.
Figure 11:
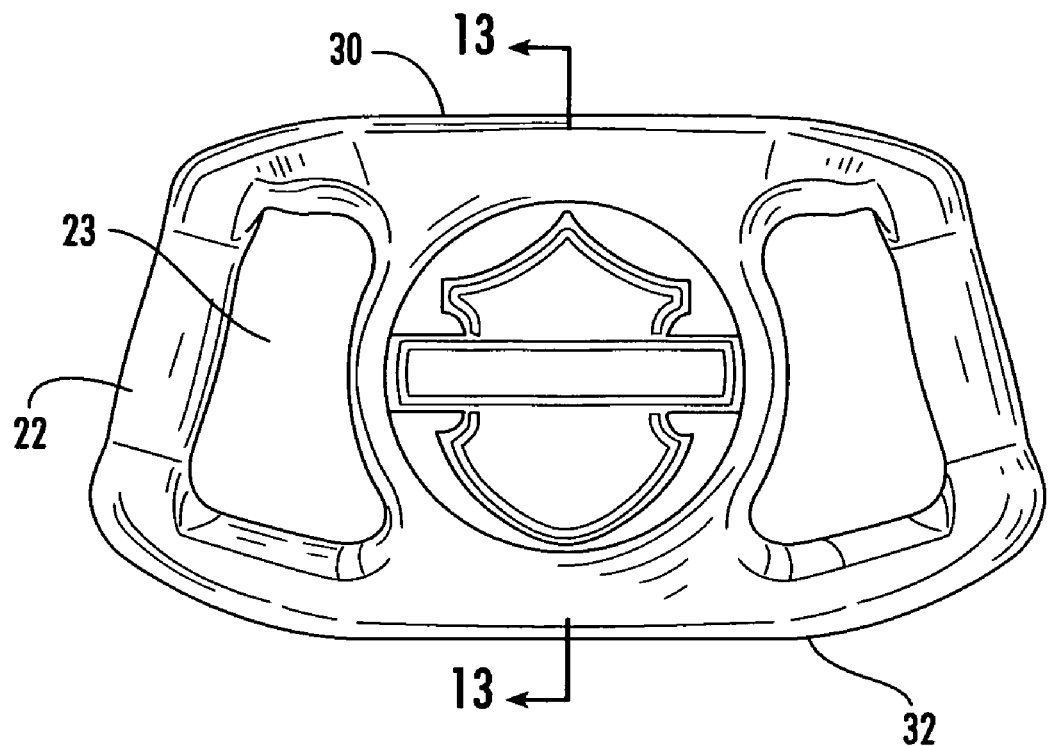
FIG. 11 is a front elevation view, similar to FIG. 4 but showing a more stylized version of the safety gripping device.
Figure 12:
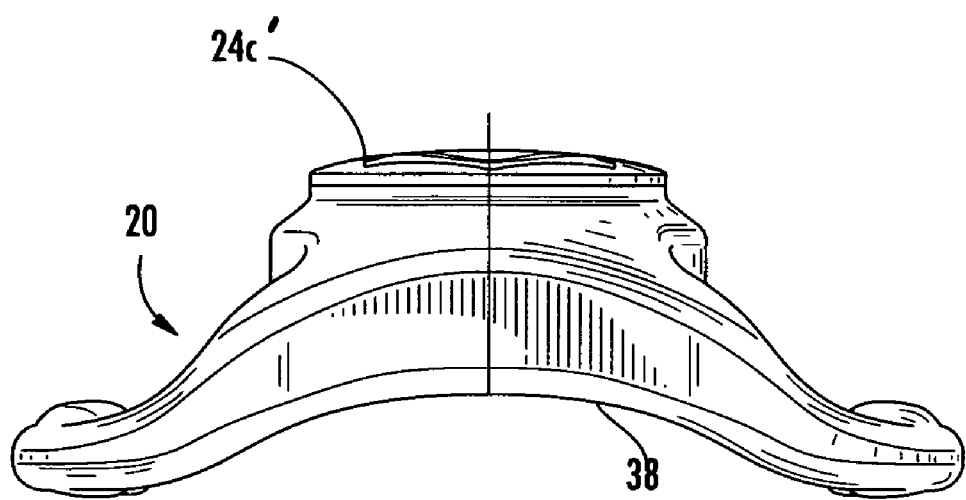
FIG. 12 is a plan view of the version illustrated in FIG. 11.

Referring particularly to FIG. 10, handles 22 are inclined so as to tilt at their upper ends inwardly of the device body 20 relative a generally vertical centerline 26 through the gripping device body 20. The handle grips 22, thus leaning inwardly at their tops, angularity afford an ergonomic positioning of the passenger's hands. Thus, the passenger's hands lean naturally inwardly with palms comfortably facing slightly downwardly. The passenger's larger index and middle fingers are positioned inwardly and close to the upper edge of the device, and the smaller fingers are positioned slightly outwardly near the bottom of the handles 22. More specifically, as illustrated in FIG. 10, each handle 22 is inclined inwardly at its top end at an angle A relative to the device body centerline. A result is that openings 23 broaden toward the lower end thereof. This enables easy withdrawal of the passenger's hand as needed, particularly during emergencies.

By way of example only, and not intended as limiting invention scope, device 20 is illustrated in FIG. 10 as including an angle A between about 12 and 22 degrees relative to device 20 vertical center axis 26. An angle A of about 17 degrees has been found particularly useful, however any angle or range of angles within or relatively close to the previously specified range may be utilized. Because of angle A, the overall body of gripping device 20 is slightly wider at the bottom than at the top thereof.

In any case, the opening 23 defined by a handle 22 must be sufficiently large to enable a passenger to readily and instantly release at least one end of the safety gripping device 20 as necessary. For example, one end 14, 16 of the gripping device 20 must be readily released to accommodate rapid dismount. The reason for this is grounded in basic physics, more specifically the inertia precepts of Newton's first law.

In a motorcycle (or other open vehicle) emergency, as when an accident is clearly unavoidable or perhaps underway, the passenger must have immediate freedom from encumbrance with the crashing vehicle or the vehicle operator, each with its own "state of motion." Experience bears out that riders are considerably better off when not forced to share the same state of motion as that of the motorcycle and, thus, in no way should be tethered or otherwise encumbered by the crashing vehicle. (Ref: The Physics Classroom, "The Motorcyclist" found at physicsclassroom.com/mmedia/newtlaws/mb.cfm)

Figure 13:
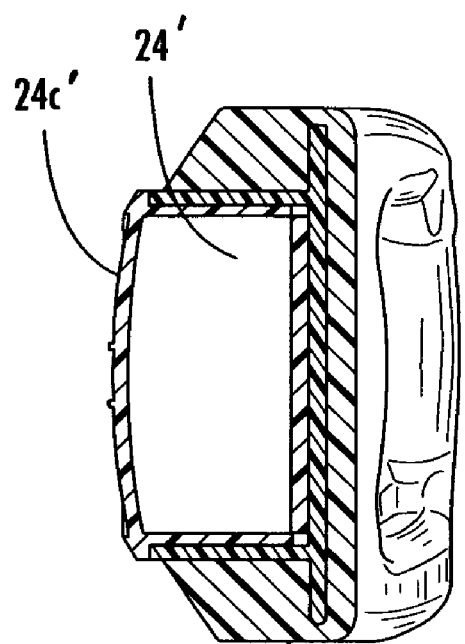
FIG. 13 is a cross-section of the device stylized version taken at section line 13-13 of FIG. 11 and illustrating alternative container structure features.
Figure 14:
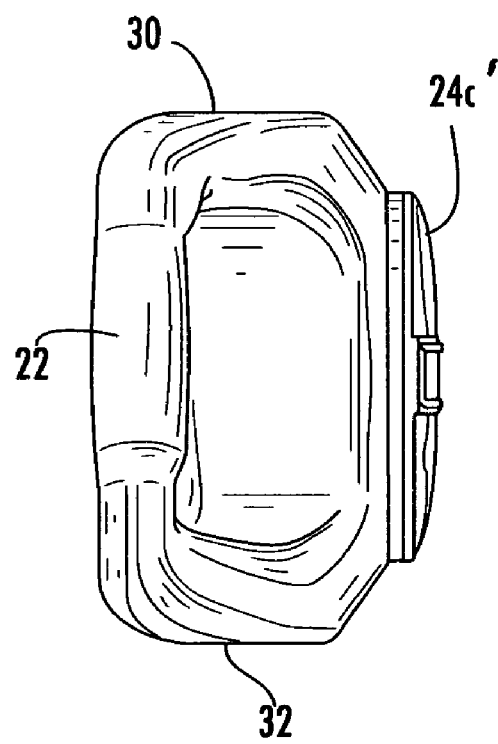
FIG. 14 is a side elevation view of the device illustrated in FIG. 11.

The novel gripping device 20 may enjoy a number of advantageous features. For example, the device may be flexible and resilient, lightweight and reliably float on water (particularly in a personal watercraft context). It may include such features as a switchable light element (such as a diode powered by an imbedded or enclosed socket, power source and wiring, not shown). The handles may be heated (also via embedded or enclosed power source and suitable wiring or power grid, not shown). The storage container 24 may be furnished with a suitably positioned lock (not shown) for content security. A cap 24c for the storage container 24 is suitable for having engraved thereon a personal logo or an affiliate symbol as viewed in FIGS. 4, 9 and 11-14. FIG. 13 (a cross-sectional view taken at line 13-13 on FIG. 11) illustrates an alternative container structure 24' wherein lid 24c' has a depending, integral cup-like cylindrical portion defining internal storage space.

In controlled, confidential tests with prototypes, safety device 20 has proven highly effective. Motorcycle passengers enjoy convenient, comfortable, and secure handles 22 to hang onto in order to maintain balance and position, as well as to stay attuned to the operator's physical attitude when negotiating turns or changing lanes, and so forth. The device 20 also is deemed exceptionally comfortable, non-distracting and non-invasive from the vehicle operator's viewpoint, and in no way impairing operation of the vehicle (motorcycle). Because the passenger is easily seen by the operator as maintaining a secure hold on the gripping device 20, the operator may be less concerned about passenger safety and better concentrate on vehicle operation.

The preferred embodiments of the invention described herein are exemplary, and numerous modifications, variations, and rearrangements can be readily envisioned to achieve an equivalent result.

I claim:

1. A safety gripping device for stabilizing a passenger riding tandem on a moving vehicle behind an operator of said vehicle, said safety gripping device comprising:

a discrete article having a body with substantially coextensive front and rear faces;

said front and rear faces of said body terminate at first and second extreme ends;

said first and second ends are configured to define openings forming a first and second handle, respectively at said first and second ends of said discrete article;

said openings defined at said first and second ends extend from said front to said rear face of said body;

said body having a generally vertical centerline;

said first and second handles are formed with upper and lower handle ends so as to have an inclination inwardly at the upper ends thereof toward said body's vertical centerline, thereby providing said passenger with a natural ergonomic grip with palms turned slightly downwardly;

said discrete article body rear face is slightly curved from said first to second extreme ends thereof, thereby conforming to said operator when engaged therewith;

whereby said passenger may manually position said safety gripping device in front of said operator and grasp said first and second handles to maintain stability on said moving vehicle, said safety gripping device further including: a storage container incorporated into said discrete article body; said container including a removable cover.

2. The safety gripping device of claim 1 further defined by:
said container and said cover are waterproof.

3. The gripping device of claim 1 further defined by:
said body consists of a semi-rigid polymer material that is flexible and water buoyant.

4. The gripping device of claim 1 further characterized by:
said gripping device includes a semi-rigid polymer body;
said body is overlaid at least in part with a polymeric foam material;
whereby said safety gripping device is easily fabricated, substantially lightweight, water buoyant and has a sure-grip surface.

\* \* \* \* \*